UNITED STATES PATENT OFFICE.

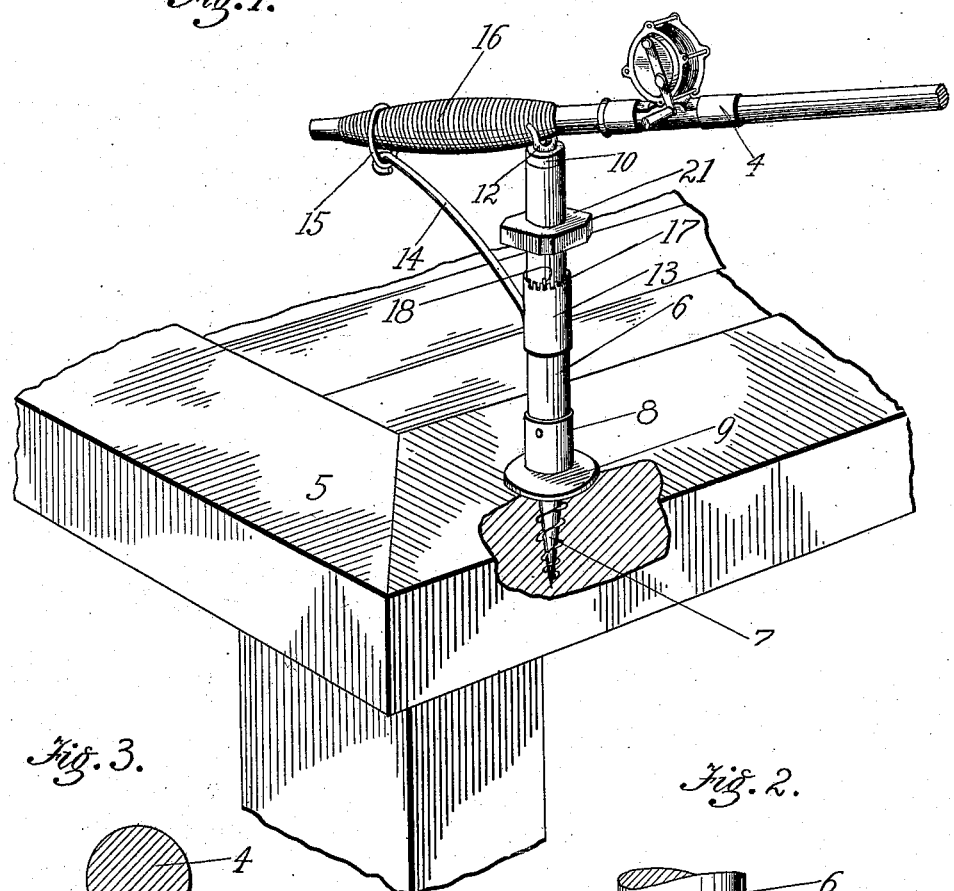

CHARLES W. UNGER, OF LOS ANGELES, CALIFORNIA.

FISHING-ROD SUPPORT.

No. 919,981.   Specification of Letters Patent.   Patented April 27, 1909.

Application filed July 14, 1908. Serial No. 443,425.

*To all whom it may concern:*

Be it known that I, CHARLES W. UNGER, a citizen of the United States, residing at Los Angeles, in the county of Los Angeles and State of California, have invented new and useful Improvements in Fishing-Rod Supports, of which the following is a specification.

This invention relates to a device for supporting a rod in a position for fishing and the prime object is to provide a simple support which is easily secured in place and is adaptable to all wind and tide conditions.

The construction embodies a supporting member having a means for quickly and conveniently securing it to a wharf or other structure, the supporting member being provided on its upper end with a means adapted to directly engage and support the rod. The engaging means is made revoluble so that the rod may be placed down the wind or the tide and is also constructed to allow the pole to be easily and quickly placed therein and removed therefrom.

In the accompanying drawings, forming a part of this specification:—Figure 1,—is a perspective view showing the improved support in use. Fig. 2,—is an enlarged side elevation of a portion of the support. Fig. 3,—is an enlarged cross-section of the upper end of the support and the attachment for supporting the rod for whipping.

In the drawings 5 designates a wharf structure or any other suitable fixed object to which the fishing rod support may be secured. The support comprises an upright supporting member 6 provided with a wood screw 7, or other equivalent securing means on its lower end. In the present construction a ferrule 8 and a flange 9 are provided on the lower end of member 6 to give added stability to the support and a nut 21 affords convenient means for turning the supporting member. Supporting member 6 is preferably cylindrical and is provided with a ferrule cap 10 on its upper end. Pivotally mounted on screw 11 at the upper end of member 6 is a curved rest 12 in which rod 4 is placed. Surrounding supporting member 6 is a sleeve 13 on which is mounted an angularly projecting resilient rod or wire 14, loosely carrying at its end a ring 15 in which the end of rod handle 16 is placed. Resilient rod 14 is preferably made of German silver or brass as these metals afford the requisite resiliency and are not corroded by the action of salt water. Sleeve 13 is notched as at 17 on its upper edge and a stop, in the form of a pin or lug 18, is mounted on supporting member 6 and adapted to enter the notches.

In using the improved support wood screw 7 is secured in the wharf or other convenient object so that supporting member 6 is rigidly held in place. Rest 12 and sleeve 13 are then turned on the supporting member so that the rod will rest in the desired position when placed in the support, sleeve 13 being forced upwardly so that stop 18 engages in notches 17 to prevent the sleeve from being turned. After the line has been thrown the end of the rod is placed in ring 15 and the rod laid in rest 12, this position being shown in Fig. 1. When it is desired to remove the rod from the support it will be seen that it can be done very quickly and the rod pulled upwardly at the same time as it is only necessary to grasp the rod outside of the support and pull upwardly. It is extremely desirable to have the immediate supporting members which are in engagement with the rod arranged to be revoluble upon the support so that the rod can be placed pointing down the wind in the same direction in which the line is blown. This revoluble construction therefore, constitutes one of the prime features of the present invention.

In Fig. 3 I have shown an attachment for supporting the rod for whipping. This attachment consists of an auxiliary rest 20 adapted for placement over rest 12 and having a curved upper surface upon which the rod is placed. The curve of the auxiliary rest is not so deep as that of rest 12 and therefore allows the desired lateral movement of the rod.

Having described my invention, what I claim as new and desire to secure by Letters Patent is:—

1. A fishing rod support, comprising a vertically disposed supporting member provided with securing means on its lower end, a revoluble forked rod support on its upper end, a resilient rod engaging means revolubly mounted on said supporting member, said means comprising a sleeve provided with a toothed upper edge and an outwardly extending resilient wire arm, said arm provided with a rod engaging means, and a pin rigidly secured to said supporting member, said pin adapted to engage the teeth formed on the sleeve, whereby the rod engaging means may be adjusted and locked in different positions.

2. A fishing rod support, comprising a supporting member provided with a securing means on its lower end, a revoluble rod engaging means on its upper end, said engaging means adapted to resiliently support the rod, a rod whipping attachment detachably secured to said rod engaging means, and means to lock said engaging means in position.

In witness that I claim the foregoing I have hereunto subscribed my name this 7th day of July, 1908.

CHAS. W. UNGER.

Witnesses:
   JAMES T. BARKELEW,
   OLLIE PALMER.